United States Patent [19]

Clarke

[11] Patent Number: 4,897,119
[45] Date of Patent: * Jan. 30, 1990

[54] AQUEOUS DISPERSION OF GROUND SLAG

[75] Inventor: William J. Clarke, 162 Spencer Pl., Ridgewood, N.J. 07450

[73] Assignees: Geochemical Corporation; W. J. Clarke, both of Ridgewood, N.J.

[*] Notice: The portion of the term of this patent subsequent to Aug. 2, 2005 has been disclaimed.

[21] Appl. No.: 142,464

[22] Filed: Jan. 11, 1988

[51] Int. Cl.$^4$ ............................................. C04B 7/14
[52] U.S. Cl. .................................... 106/117; 106/76; 106/90; 106/95; 52/744
[58] Field of Search ................... 106/117, 76, 90, 95; 52/744

[56] References Cited

U.S. PATENT DOCUMENTS

| 3,809,665 | 5/1974 | Allemand et al. | 260/29.6 S |
|---|---|---|---|
| 3,904,568 | 9/1975 | Yamaguchi et al. | 106/308 M |
| 4,242,142 | 12/1980 | Gee et al. | 106/117 |
| 4,306,912 | 12/1981 | Forss | 106/117 |
| 4,342,599 | 8/1982 | Mann et al. | 106/100 |
| 4,681,634 | 7/1987 | Roca et al. | 106/90 |
| 4,761,183 | 8/1988 | Clarke | 52/744 |

FOREIGN PATENT DOCUMENTS

| 0097513 | 12/1985 | European Pat. Off. | |
| 2228791 | 12/1973 | Fed. Rep. of Germany | 106/117 |
| 1038315 | 8/1983 | U.S.S.R. | 106/103 |
| 2018737 | 10/1979 | United Kingdom | |

Primary Examiner—Mark L. Bell
Assistant Examiner—Anthony J. Green
Attorney, Agent, or Firm—Harold L. Greenwald

[57] ABSTRACT

Disclosed is a novel composition comprising water, ground blast furnace slag and a low molecular weight polymeric dispersant. The dispersant is a polymer of acrylic acid, having a molecular weight between 1000 and 20,000, and being in the form of the acid or the salt of an alkali metal or ammonia. A process for preparing a dispersion having the novel composition is also disclosed.

22 Claims, No Drawings

AQUEOUS DISPERSION OF GROUND SLAG

This invention relates to a chemical composition for dispersing ground slag, the slag so dispersed and a process for preparing the dispersion.

The slag of this invention is ground, granulated iron-blast-furnace slag, a byproduct in the production of iron. Slag may be employed as the sole cementitious material, particularly when activated as by strong alkalies, but is often used as a component of a cementitious composition comprising portland cement; such a composition is known as slag cement. Slag, activated slag and slag cement are useful in a variety of applications such as in mortar, grout, ready-mixed concrete and precast concrete.

Dispersants, with which this invention is concerned, are sometimes referred to as plasticizers, superplasticizers or water reducers. A dispersant serves to decrease the agglomeration of the slag particles when the slag is immersed in water. In grouting this results in improved permeation by the grout, particularly into earthen formations having fine pores. Improved flow of the dispersed slag-water composition results in better mortar penetration in mortaring and better adhesion of the mortar. The decreased agglomeration of the slag and resulting improved flow of the composition results in improved pumpability and effective filling of all the space in a mold or other structure, especially small reentrances such as where structural steel members are clustered close together. In more general terms, agglomeration of slag particles in an aqueous cementitious composition results in (1) decreased penetration of fine pores, as in grouting, because of the size of the agglomerate and (2) weakened final structure, such as concrete, because the particles in the agglomerate are not firmly bonded thus act as a weak layer and possibly as a crack initiator.

Materials previously proposed as water reducing agents or superplasticizers for cement compositions are described in *Chemical Admixtures for Concrete*—2nd ed., M. R. Rixom and N. P. Mailvaganam, N.Y., E. & F.N. Spon, 1986 and *Concrete Admixtures Handbook*, V. S. Ramachandran, ed., Park Ridge, N.J., Noyes Publications, 1984, both herein incorporated by reference. Examples of such materials are lignosulfonates, naphthalene sulfonate formaldehyde condensates and other sulfonated polymers. European Patent Specification No. 97,513, published Dec. 18, 1985, teaches a cementitious composition comprising, as a plasticizer, a copolymer of an ethylenically copolymerizable carboxylic acid and a hydroxyalkyl ester of such acid.

Forss, U.S. Pat. No. 4,306,912, discloses a process for producing a binder (cement), for use in slurry, mortar or concrete, employing slag and a sulfonated polyelectrolyte as a plasticizing material. To shorten the hardening time of concrete employing the binder, small amounts of sodium carbonate and/or sodium hydroxide are used. The slag employed is ground to a specific surface of at least 400 square meters per kilogram. The sulfonated polyelectrolyte is selected from: lignosulfonates, sulfonated lignins, melamine-formaldehyde condensates and naphthaleneformaldehyde condensates. Optional components in the binder are portland cement clinker and slaked lime.

One object of the instant invention is to furnish an alternative to the use of a sulfonated polyelectrolyte in the slag-containing formulation and applications taught by Forss. By their nature, sulfonated polyelectrolytes have the potential to degrade in the environment to a strong mineral acid known to be damaging. The polycarboxylic acid of the instant invention does not have this potential for damage to the environment.

It is an object of this invention to provide a composition, comprising slag and a dispersant, which permeates a formation being grouted more effectively than the prior art compositions. A related object is the preparation of a grouted formation having a vastly decreased, such as one hundred fold decreased, rate of leaching of liquid through the formation in applications such as:
 dam grout curtains;
 containers and conduits such as those comprising cement and slag;
 encapsulated waster materials;
 grouted soil, rock or sand;
 incorporation blocks comprising slag, caustic and aqueous waste including radioactive or other hazardous waste; and
 stabilization of hazardous waste plumes.

Another object is to furnish a chemically resistant, non-toxic composition useful in the various applications described herein.

A further object of this invention is the achievement of high density, after setting, in the matrix formed by employing the dispersed slag. This increase in density is obtained over a wide range of slag particle sizes. Associated properties are increased tensile and compression strengths and weather resistance. These properties are especially significant in applications such as bridge decks and highways. In these and other uses the improved chemical, particularly salt, resistance is important.

A further object of this invention is a dispersant which inhibits hardening of the cementitious composition less and is effective at lower concentrations than the sulfonates of the prior art. In contradistinction from some of the prior art dispersants, the instant dispersant is free of formaldehyde and other toxicants.

An additional object is a composition, comprising slag, lower in viscosity and more readily pumped than slag compositions comprising prior art dispersants.

Other objects and advantages will become apparent from the following description and claims.

SUMMARY OF THE INVENTION

This invention contemplates a composition comprising water, ground granulated blast-furnace slag and, to disperse the slag in the water, an addition polymer having a molecular weight between about 1,000 and about 20,000. The polymer being a polymer of at least 70%, by weight, acrylic acid with the remaining 30% or less consisting of other carboxylic acid monomers or non-condensing monomers (i.e., monomers having mer units which do not condense with carboxylic mer units). The composition comprises an effective amount of the polymer to disperse the slag in the water. The polymer is unneutralized or is partially or completely neutralized by monovalent inorganic ions. As used herein "polymer of acrylic acid" is intended to refer to the acid polymer or the partially or completely neutralized polymer.

This invention also teaches a process for preparing a dispersion of the composition of the invention.

DETAILED DESCRIPTION

Surprisingly, it has been found that an addition polymer of acrylic acid having a molecular weight between about 1,000 and about 20,000 is a more effective dispersant for dispersing slag in water than the sulfonated polyelectrolytes of the prior art.

Although the mechanism of the dispersion of slag is not completely understood, the following theoretical comments are offered to aid in teaching the invention. These comments may be somewhat speculative and are not to be construed as being binding or to be limiting with regard to the scope of the invention. It is believed that slag has some positively charged sites on its surface, probably —O—Ca+ sites. The acrylic acid polymer, being negatively charged in aqueous solution from moderate to high pH, is absorbed on the slag by the ionic charge interaction of its —COO− groups with the —O—Ca+ sites. For strong absorption, a number of the carboxylate groups on each polymer molecule absorb in this way. When the polymer molecule is low in molecular weight, thus in physical length, it absorbs on a single slag particle. The slag particle bearing one or several absorbed polymer molecules is then highly negatively charged by virtue of there being an excess of carboxylate groups in the polymer. Such a slag particle repels its similarly charged neighbors and the result is a well dispersed system of slag particles. However, when the molecular weight of the polymer is too high, the polymer molecule is long enough to absorb onto two slag particles at one time. This bridging of the polymer between two slag particles results in a flocculated system. Such a flocculated system results in poor properties in many slag formulations such as low formation permeation when the slag is used to form a grout and low strength when the slag is used in concrete.

That effective dispersion is obtained over a limited molecular weight range has implications with regard to the acceptability of certain comonomers in the largely acrylic acid polymer. An ethylenically unsaturated monomer bearing an atomic group which can undergo a condensation reaction with the carboxylic acid group of the acrylic acid mer units is unacceptable. Such a monomer incorporated in the polymer could serve to link separate polymers together forming new polymers of higher molecular weight, how much higher being dependent on how many times the condensation-crosslinking reaction is repeated. Clearly, condensation-crosslinking can convert a dispersant to its opposite, a flocculent. One example of a condensation-crosslinking group is an amino group, as in aminoethyl methacrylate, which could react with a carboxylate to form an amide linkage. Another example is a hydroxy group, as in hydroxyethyl acrylate, which could react with a carboxylate to form an ester linkage. Other examples of condensing groups are epoxy, isocyanato and the like. Monomers acceptable as comonomers in the formation of the polymer of acrylic acid are these which are free of groups which can condense with carboxyl groups. These monomers are referred to herein as noncondensing and the mer units produced therefrom in a copolymer with acrylic acid are called noncondensing units. Tables 1 and 6, below, have examples of dispersants comprising hydroxyl and carboxyl groups in one molecule.

Ethylenically unsaturated monomers which produce noncondensing units when copolymerized with acrylic acid include the alkyl esters of acrylic and methacrylic acids such as ethyl acrylate, methyl methacrylate and propyl acrylate, aliphatic esters of vinyl alcohol such as vinyl acetate, ethylenically unsaturated hydrocarbons such as ethylene, propylene and styrene, certain nitrogen-containing momomers such as acrylamide, methacrylamide, acrylonitrile and halogenated momoners such as vinyl chloride and vinylidene chloride and the like; preferred are ethyl acrylate, methyl methacrylate, acrylonitrile, acrylamide and methacrylamide.

Monomers having carboxylic acid groups, such as methacrylic acid and itaconic acid, are a special case. These monomers are acceptable comonomers and their acid groups are noncondensing because of the particular chemistry regarding anhydride formation. The carboxyl unit of such mer units in the polymer will not link with the carboxyl unit of acrylic acid mers, to form an anhydride linkage, because of the presence of excess water and the high pH of the slag system. Any anhydride formed would be readily hydrolyzed thus dissolving the crosslink.

Another type of crosslinking of the carboxylate groups of polymer molecules is ionic crosslinking by multivalent metal ions. The metal ion, magnesium ion ($Mg^{++}$) for example, can link two molecules by bonding to a —COO− group on each molecule. Repetition of this type of bonding would lead to an ionically linked high molecular weight polymer molecule. The resulting polymer is expected to perform poorly as a dispersant for the reasons given above in regard to condensation-crosslinked polymers. Table 5, below, has data on the dispersion performance of magnesium polyacrylate dispersants.

The addition polymer of acrylic acid is preferably a homopolymer of acrylic acid. Other embodiments of the invention include an acrylic acid copolymer with up to 30%, preferably up to 10% by weight, of other ethylenically unsaturated monomers selected from acid monomers, such as methacrylic acid and itaconic acid, and noncondensing monomers, such as ethyl acrylate, methyl acrylate, methyl methacrylate, acrylamide, acrylonitrile and methacrylamide. The molecular weight of the polymer is preferably between 2000 and 10,000.

The addition polymer of acrylic acid is employed, in the composition of the invention, in an effective amount, i.e., effective to disperse the slag in the water. Effective dispersion of the slag is gauged by measurement of the viscosity of the composition and preferably by the permeation of the composition in a formation or bed having fine pores; both types of measurements are described hereinbelow. Other techniques for demonstrating effective dispersion are well known to those practiced in the art and include microscopic examination of the composition, rate of sedimentation measurements and laser light scattering measurements. The examples given below exemplify the use of bed permeation and composition viscosity to gauge the effectiveness of a dispersant. A desirable amount of the acrylic acid polymer, in the composition, is up to 3% of the weight of slag with 0.05% to 1.5% being more desirable and 0.1% to 0.5% most desirable. The acrylic acid polymer is formulated with other dispersant components in some instances.

The acrylic acid polymer is employed in the form of its monovalent inorganic salt produced by partial or complete neutralization. The monovalent inorganic counterions may be any of the alkali ions or ammonium ion with sodium ion and potassium ion being preferred, sodium ion being most preferred. These ions may be made available by optional components of the composition.

The water employed in this invention is pure water or, in many specific applications, dilute aqueous solutions. Such waters include both hard and soft tap water, river and stream water, water from underground sources such as well water including connate water from oil wells, sea water and brines, and in certain preferred applications, water containing toxicants or radioactive materials. The weight ratio of water to slag may be low, such as about 0.2 or 0.3, or high, such as about 10 or 15. Low water ratios are frequently used in the preparation of concrete or concrete-like materials. A higher ratio, one or more, is found in grout compositions. One preferred embodiment of this invention, a grout employed to seal off formations having fine pores, employs a water to slag ratio of about one to about twelve with one and one-half to seven being preferred and two to three being most preferable. A second preferred embodiment is a cement employing a water to slag ratio of about two-tenths to four-tenths ordinarily, but for some uses, such as transport as a slurry, a ratio up to about one is used. When other cementitious materials are used the water ratios apply to the total cementitious material.

The slag employed in this invention is a by-product obtained in the blast furnace process of smelting iron ore to produce iron. In the blast furnace, slag is generated, typically at about 1550° to 1650° C., from other minerals in the iron ore, coke ash and the limestone used as a flux. This slag is skimmed from above the iron, granulated by treatment with water and ground. This preparation and the separation of the ground slag into particle size grades, such as by screening or air elutriation, are conventional in the art. Typically the granulation employs high pressure water sprays followed by immersion of the slag in a pit of water to produce a slag having a high glass content. However produced, it is desired that the slag used in this invention have a high glass content, preferably above about 95% glass. It is also preferred that the water content be low, preferably below about 15%. A usual dry composition range and two examples of slag are (in weight percent):

| Component | $SiO_2$ | $Al_2O_3$ | CaO | MgO | FeO | S | $Mn_2O_3$ |
|---|---|---|---|---|---|---|---|
| Usual Range | 30–40 | 8–18 | 35–50 | 0–15 | 0–1 | 0–2 | 0–2 |
| Typical Slag | 36.4 | 16.0 | 43.3 | 3.5 | 0.3 | 0.5 | <0.1 |
| Typical Slag | 35.5 | 11.4 | 39.4 | 11.9 | 0.2 | 0.2 | — |

A commonly available slag has a specific surface area greater than 3000 cm$^2$ per gm.

Some embodiments of the invention employ, in addition to slag, various hydraulic cements and inert solid particulate fillers or aggregates known to those skilled in the art of preparing concrete. The commonest cement is portland cement. Portland cement is a hydraulic cement consisting mainly of calcined silicates of calcium. Five types of portland cement (I through V) are generally recognized, their manufacture, properties and characteristics are described in detail by J. F. Young, ACI (American Concrete Institute, Detroit, Michigan) Education Bulletin No. E3-83, pages 1 through 8, herein incorporated by reference.

While slag, with or without portland cement, is used in embodiments of the invention without inert filler material, in some instances it may be desirable to incorporate limited amounts of other solids. Such other solids are clay, bentonite, kaolin, vermiculite, limestone, silica flour, silica fume and other well known inert solids. The amount of these employed is to be limited so as not to reduce the strength of the set solid product excessively, i.e. by 30% or more.

In other embodiments of the invention an alkali silicate is employed. The alkali silicate is preferably an aqueous colloidal suspension of an alkali salt of silicic acid. Throughout the specification and claims, the term "alkali silicate" is intended to refer to alkali metal silicates having an alkali metal oxide:silicon dioxide weight ratio within the range from about 1.0:3.0 to 1.0:4.0, notably sodium silicates having a sodium oxide:silicon dioxide weight ratio within the range of from about 1:3.0 to 1:4.0, preferably, about 1:3.0 to 1:3.5. An especially preferred material is an aqueous sodium silicate having a sodium oxide:silicon dioxide ratio of about 1:3.2 to 1:3.3 and a $Na_2O$—$SiO_2$ solids content of about 35 to 45%. The term "alkali metal," as used in the specification and claims, is intended to refer to the various alkali metals, i.e., sodium, potassium, lithium, rubidium, cesium and mixtures thereof. Silicates of potassium and sodium are more generally available. Because of their lower cost and availability, sodium silicates are more widely used and, therefore, are preferred in the practice of the present invention. Particular reference hereinafter is made to such silicates. The alkali silicate is especially useful in the preparation of low cost compositions having a very fast set time for uses such as underground water control.

An orthophosphate ion is useful in the control of set time, especially in grout compositions comprising alkali silicates, by delaying setting. The orthophosphate ion is any of the orthophosphate ions, generally existing in equilibrium with each other in aqueous solution, $PO_4^{---}$, $HPO_4^{--}$ and $H_2PO_4^{-}$. In highly alkaline systems it is expected that $PO_4^{---}$ predominates. Two of the most available sources of orthophosphate ion are orthophosphoric acid, $H_3PO_4$ and sodium phosphate decahydrate, $Na_3PO_4.10H_2O$. Orthophosphoric acid is commonly the commercial grade 85%, by volume, with water. Other phosphates, such as the polyorthophosphates, may be employed as the source of the orthophosphate ion.

Other useful components include alkaline materials, such as NaOH and $Na_2CO_3$. NaOH is commercially available in solid and aqueous solution grades. $Na_2CO_3$ is usually a solid grade. Each serves to control the rate of hardening of the composition, particularly in formulations high in slag. Thus, NaOH and/or $Na_2CO_3$ may be regarded as a set time catalyst which, when employed in limited amount, has little if any effect on other properties of the set product, however, overdosage will decrease strength. Favored are formulations in which the $Na_2CO_3$ is less than equal to NaOH by weight.

A particularly useful embodiment of this invention is in grouting. A preferred grouting composition of this invention comprises:
(1) A cementitious material (CM) comprising: (a) fine slag, i.e., slag having a specific surface area greater than 5,000, preferably greater than 8,000 and most preferably greater than 10,000 square centimeters per gram and, by weight, less than 50%, preferably less than 10% and most preferably less than 3% being particles larger than 7.8 micrometers (um) (the surface area and particle size are measured by the use of the Microtrac ® instrument) and optionally, (b) cement having a specific surface area greater than 3,000, preferably greater than 5,000 and most preferably greater than 7,000 square centimeters per gram with, by weight, less than 60%, preferably less than 50% and most preferably less than 20% of particles larger than 7.8 micrometers as measured by the Microtrac ® instrument. The preferred cement is portland cement. The cement is 150%, preferably 100%, more preferably 25% and most preferably zero percent, by weight based on the slag, except when alkali silicate is present in which case the minimum level of cement is preferably about 20%, based on slag weight.

(2) Water. The water to cementitious material weight ratio being 1:1 to 12:1 or greater, preferably 1.5:1 to 8:1 and most preferably 2:1 to 3:1 (4:1 to 6:1 when silicate is used). There is always at least as much water as cementitious material and sufficient water to form a flowable grout.

(3) Poly(acrylic acid), having a molecular weight from about 1,000 to about 20,000, in an effective amount for dispersing the cementious material in water. The amount of poly(acrylic acid) is preferably up to 3%, and most preferably 0.1% to 0.5% of the weight of the slag.

For adapting to specific use requirements or operating conditions, optional additional materials in the grout are as follows, amounts being in weight percent solids based on the weight of cementitious material unless otherwise noted:

(4) NaOH, $Na_2CO_3$ or a mixture of these up to about 15%, preferably up to 10% and most preferably about 3% to 8% of the weight of slag plus about 0% to 4% of the weight of portland cement.

(5) Alkali silicate up to about 150%, preferably 60% to 80%.

(6) When alkali silicate is present, up to about 10%, preferably about 1% to 5% of orthophosphate ion.

(7) Other optional ingredients comprise materials such as inert filler material, additional dispersants, plasticizers, defoamers and the like well known to those skilled in grout formulation.

A process for preparing the slag dispersion of this invention comprises combining ground blast furnace slag, water and the polymer of acrylic acid and intensively agitating the combination to disperse the slag in the water. In general, the process contemplates combining the components of the invention, which may include optional components, in the ratios taught herein and agitating or mixing them intensively to disperse the components in the water. Agitating and mixing equipment is readily available commercially and is well known to those practicing the art, examples of laboratory scale equipment are furnished hereinbelow. A preferred commercial scale mixer is a Colcrete Colloidal Mixer.

In a typical operation the solids are added to the liquid in the vortex of the mixer, shear occurs in the volute (the impeller having narrow clearance and running at high speed), the return from the pump to the tank forms a vortex in the tank. Mixing is continued to obtain a uniform composition. For injection into a formation in grouting, high speed, high horsepower, high pressure pumps are normally employed.

When silicates are employed common practice is to admix the water-diluted silicate with the slag dispersion by a confluence of separate flow lines leading from separate storage tanks, i.e., to employ what is known as a two part mix with pipe mixing. The mixed grout is pumped into the formation where gellation occurs and the grout solidifies rapidly. Other practices are to pump the two components into the pipe alternatingly or into the formation by separate pipes or sequentially in one pipe with mixing and gellation occurring in the formation. The silicate component is made by diluting the silicate solution as received, usually about 35 to 45% solids, with a portion of the water of the composition. The fraction of the water employed in the silicate component may be left to the judgement of the skilled operator but is normally 40% to 85%, preferably 50% to 80%, of the water in the composition.

The following materials are used in the various examples which follow. Unless otherwise stated, all formulation percentages are on a solid basis, the water used is tap water and the various tests are conducted at room temperature. The examples are presented to illustrate the nature of the invention and the manner of practicing the same.

Cementitious Materials:

M1 is an ultrafine slag having a specific surface area about 13 000 square centimeters per gram with up to about 1% of the particles, by weight, having a diameter larger than 7.8 micrometers (um).

M3 is an ultrafine portland cement having a specific surface area about 7,000 square centimeters per gram with about 15% of the particles, by weight, having a diameter larger than 7.8 micrometers.

M5 is an ultrafine slag/portland cement having a specific surface area about 9,000 square centimeters per gram with about 9% of the particles, by weight, having a diameter larger than 7.8 micrometers.

The particle size data are obtained by means of a laser light scattering particle size distribution apparatus (Microtrac ® made by Leeds and Northrup Instruments). M1, M3 and M5 are supplied by Geochemical Corp., Ridgewood, N.J.

Because there is some lot to lot variation in the cementitious materials, for refined measurements a single lot is used and dispersants are intercompared in a series of measurements performed at one time.

Sand:

In the permeation tests, the test sand is a fine sand having the following particle size distribution:

| U. S. Standard Sieve: | 40 | 50 | 70 | 100 | 200 |
|---|---|---|---|---|---|
| Sieve Opening (microns) | 420 | 297 | 210 | 149 | 74 |
| Wt. Percent Finer | 99 | 91 | 36 | 4 | 1 |

Dispersants:

The following is a listing of the dispersants employed. The concentration of the dispersant in the aqueous solution (% aq.) is that furnished by the listed supplier or the manufacturer. In some of the tables the listed abbreviation is used in place of the full name of the dispersant. Molecular weight data are those furnished by the supplier or the manufacturer.

It is preferred that the polymer of acrylic acid be prepared by solution polymerization in a solvent system comprising an organic solvent. A desired solvent system comprises water and an organic compound having appreciable chain transfer activity such as an alcohol with such activity, preferably isopropyl alcohol. Initiation is by means of a free radical generator, such as a water soluble peroxide or persulfate, with hydrogen peroxide being preferred. An activator system may be used, employing materials such as metal salts and amines as is known in the art. Polymerization is normally conducted at an elevated temperature and may be limited by the boiling point of the solvent system. When polymerization is complete, i.e., after all of the monomers have been added and there is little heat of reaction being produced, the reaction may be "chased" by the addition of more free radical generator. The organic solvent is then removed by distillation, which may be that of an azeotrope, and the polymer neutralized with base, such as NaOH. Depending on the properties of the specific polymer, those skilled in the art will make appropriate choices of solvent, reaction conditions, initiators, order of solvent removal and neutralization steps, etc. It is desired that the final polymer product be present at about 40% or higher solids in water at a pourable viscosity for easy handling. One process for the preparation of such final polymer product is that of Hughes et al. disclosed in U.S. Pat. No. 4,314,044 herein incorporated by reference.

| Abbreviation | Name | Description | Supplier |
|---|---|---|---|
| | Disal | Naphthalene-sulfonate-formaldehyde condensate (NSFC) (43% aq.) | Handy Chemicals |
| | Aerosol 22 | Tetrasodium N—(1,2 dicarboxy-ethyl) -N— octadecylsulfosuccinamate (35% aq.) | American Cyanamid Co. |
| | Daxad 16 | Na salt of polymerized alkyl naphthalene sulfonic acid (44% aq.) | W. R. Grace & Co. |
| 731 | Tamol 731 | Na salt of polymeric carboxylic acid (25% aq.) | Rohm and Haas Co. |
| | PVP K30 | Polyvinyl pyrrolidone 30,000 MW (100%) | GAF Chemical Corp. |
| | PVP K15 | Polyvinyl pyrrolidone 15,000 MW (100%) | GAF Chemical Corp. |
| N—2 | NC 200 | Naphthalene-sulfonate-formaldehyde formulation (43% aq.) | Kao Soap Co. |
| | 2000 D | Na salt of copolymer of unsaturated carboxylic acid and hydroxy alkyl ester of an acid (subject of Eur. Pat. Appl. EP97513) | Cormix, Inc. |
| | 2000 CP | Polycarboxyl terpolymer, i.e., a composition like 2000D but having a third monomer | Cormix, Inc. |
| | Tamol 165 | Ammonium salt of carboxylated polyelectrolyte (21-22% aq.) | Rohm and Haas Co. |
| | Alcosperse 149 | Sodium polyacrylate (40% aq.) 5000 MW | Alco Chemical Corp. |
| 175 | Alcosperse 175 | Specialty copolymer | Alco Chemical Corp. |
| | Aquatreat AR700 | Sodium polyacrylate ca. 2000 MW (31% aq.) | Alco Chemical Corp. |
| 603N | Alcosperse 603N | Sodium polyacrylate (45% aq.) 10,000 MW | Alco Chemical Corp. |
| 208 | Polyacryl 208 | Sodium polyacrylate 5000 MW* (40% aq.) | Omicron Chemicals, Inc. |
| HSR | Lubricon HSR | Salt of hydroxylated carboxylic acids (42% aq.) | American Admixtures, Inc., Chicago, IL 60646 |
| | Deflox 1050 | Acrylic/maleic terpolymer 800-1000 MW (50% aq.) | Omicron Chemicals, Inc. |
| 104S | Polyacryl 104S | Sodium polyacrylate 1500 MW* (43% aq.) | Omicron Chemicals, Inc. |
| 124S | Polyacryl 124S | Sodium polyacrylate 4500 MW* (43% aq.) | Omicron Chemicals, Inc. |
| 134S | Polyacryl 134S | Sodium polyacrylate 6000 MW* (40% aq.) | Omicron Chemicals, Inc. |

-continued

| Abbreviation | Name | Description | Supplier |
|---|---|---|---|
| 184S | Polyacryl 184S | Sodium polyacrylate 10,000 MW* (40% aq.) | Omicron Chemicals, Inc. |
| 114S | Polyacryl 114S | Sodium polyacrylate 3000 MW* (43% aq.) | Omicron Chemicals, Inc. |
| FP30S | Polyacryl FP30S | Sodium salt of terpolymer (70% acrylic acid, 15% acrylamide, 15% noncondensing ester) 7000 MW* (41% aq.) | Omicron Chemicals, Inc. |
| 113M | Polyacryl 113M | Magnesium polyacrylate/polyacrylic acid (80/20), 3000 MW* (36.5% aq.) | Omicron Chemicals, Inc. |
| FP31M | Polyacryl FP31M | Terpolymer of FP30S, 80% neutralized by Mg(OH)$_2$ (38.5% aq.) | Omicron Chemicals, Inc. |

*Viscosity average molecular weight, the polymers are prepared by solution polymerization in an organic solvent/water system.

Silicate:
Sodium silicate is used at 37.8% solids in water, the system having a SiO$_2$ to Na$_2$O ratio of 3.22.

Other chemicals:
Employed are the usual commercial grades unless otherwise noted.

EXAMPLES

Permeation Test

The apparatus consists of:
(1) a cell filled with the test sand, closed at each end by a stopper having a single central hole,
(2) a pressurized grout supply tank connected to the bottom of the cell by tubing, and
(3) a delivering system consisting of a tube, connected to the top of the cell, leading to a graduated cylinder collector vessel. The cell is a 5 cm I.D., 15 cm long glass cylinder having a sand-retaining assembly at each end.

Each assembly consists of:
(1) a 70 mesh per inch polyester sieve cloth for retaining the sand,
(2) a close-fitting ca 5 cm O.D. flanged disk with 12 holes 1/16 inch in diameter therethrough,
(3) a rubber stopper to seal the cylinder and to bear on the flange of the disk thereby creating a small plenum chamber between the disk and the stopper, and
(4) a metal end plate having a central hole to accommodate the tube passing therethrough and edge-holes to accommodate threaded rods. Wing nuts on the threaded rods tighten down on the end plates thus forming a frame which clamps the assembly together so it can be pressurized without leaking.

The test procedure is:
(1) Press a rubber stopper into an end of the glass cylinder and then put a perforated disk and a sieve cloth into the cylinder.
(2) Weigh enough test sand for one sample.
(3) Pour one-third of the sand into the glass cylinder.
(4) Place a solid metal cylinder as a weight (about 320 grams) on the top of the sand, and apply a vibrator in the sand or against the glass.
(5) Repeat steps 3 and 4 twice; then place a sieve cloth a perforated disk on the top of the sand.
(6) Press a rubber stopper on the other end of the glass cylinder and assemble the frame.

(7) Connect the supply and delivery tubes and apply pressure to water which is in the tank in order to saturate the sand.
(8) Disconnect the tube connected to the bottom of the sample and let the water drain out by gravity. Record the volume of the water drained from the sand and label it as V1. This is the void volume in the sand before the injection of grout.
(9) Prepare the grout by agitating the formulation by means of a high speed mixer and pour it into the emptied tank.
(10) Apply 2 psi air pressure to the tank and collect the effluent from the top of the cylinder. Time the accumulated volumes of effluent and label them.
(11) The volume of slurry permeating the sand is V1 plus the accumulated volume at the noted time.

Inspection of the permeation test results in Tables 1, 2 and 3, shows that the polyacrylic acid dispersants of the instant invention yield formulations in which the slag is so well dispersed that the permeation far exceeds that resulting from the use of other dispersants, including prior art dispersants. The explanation for the relative excellence of the polyacrylic acid polymers is not well established but is likely to be associated with some adsorption of these polymers on the sand thus contributing to smoother flow lines and less turbulence in the flowing fluid. This is in addition to the effect due to the quality of the dispersion of the slag.

As an acceptance test the permeation test is performed on a grout in which a candidate dispersant is added at ca 0.4%, solids on slag, to one part M1 slag and two parts water, by weight, and tested as described hereinabove. The test is readily performed and can easily be used as an acceptance test. A dispe sant so tested is con idered excellent if the ten minute throughput is greater than 550 cc, good if greater than 400 cc, and fair if greater than 250 cc. The test sand is a fine sand obtainable from commercial sand suppliers. For greater precision, the results reported on the commercial dispersants, in Tables 1, 2 and 3, are used for calibration purposes.

The permeation test is a good test of the effectiveness of a dispersant because large aggregates of slag would block the entrance to the narrow pores of the sand bed thus leading to low throughput volumes or even a blocked bed as noted in some of the data.

TABLE 1

Permeation Tests - Prior Art Dispersants

| Grout composition by weight | 1 part M1 slag 2 parts water dispersant listed, solids as percent of slag | | | |
|---|---|---|---|---|
| | A | B | C | D |
| Dispersant | N2 | N2 | HSR | HSR |
| —% solids on slag | 0.43 | 0.43 | 0.02 | 0.60 |
| Sand bed wt. (g) | 332 | 336 | 344 | 356 |
| V1 (column void) (cc) | 14 | 12 | 13 | 14 |
| V - throughput (cc) | | | | |
| 1 minute | 99 | 112 | 60 | 92 |
| 5 minutes | 204 | — | 65* | — |
| 10 minutes | — | 249 | | 162 |
| 20 minutes | 326 | — | | — |

*Flow stopped

TABLE 2

Permeation Tests - Carboxylate Dispersants

| Grout composition | 1 part M1 slag/2 parts water by weight dispersant listed, solids as percent of slag | | | | | |
|---|---|---|---|---|---|---|
| | A | B | C[e] | D | E | F |
| Dispersant | 208 | 208 | 208 | CA604[a] 208 | 124S |
| —% solids on slag | 0.40 | 0.40 | 0.40 | 0.33 | 0.40 | 0.40 |
| Sand bed wt. (g) | 332.8 | 319.6 | 327.7 | 338.8 | 336 | 323.5 |
| V1 (column void) (cc) | 10 | 13 | 10 | 12 | 15 | 14 |
| V - throughput (cc) | | | | | | |
| 1 minute | 108 | 106 | 130 | 100 | 120 | 120 |
| 2.75 minutes | 236[d] | 234 | | | | |
| 4 minutes | | 230 | | | | |
| 5 minutes | | 362 | 420 | 220 | 365 | 325 |
| 7 minutes | | 480[d] | | | | |
| 10 minutes | | | | 255[b] | 560 | 465[c] |
| 11 minutes | | | 608[c] | | 600[c] | |

[a] CA604 is (by weight) 1 N2, 3 Tamol 731, 0.5 PVP K—15, 5.5 water
[b] Flow stopped
[c] Still flowing
[d] Exhausted supply of grout
[e] The grout in test C also contained 5% NaOH solids (added as a 50% aqueous solution)

TABLE 3

Permeation Tests - Mol. Wt. and Conc.

| | Grout composition by weight: 1 pt. M1 slag 2 pts. water listed dispersant, solids as a percent of slag | | | | | | | |
|---|---|---|---|---|---|---|---|---|
| | A | B | C | D | E | F | G | H |
| Dispersant | 104S | 104S | 124S | 124S | 134S | 134S | 184S | 184S |
| % solids on slag | 0.43 | 0.22 | 0.43 | 0.22 | 0.40 | 0.20 | 0.40 | 0.20 |
| Visc. avg. M.W. | 1500 | 1500 | 4500 | 4500 | 6000 | 6000 | 10,000 | 10,000 |
| V1 (column void) (cc) | 14 | 12 | 12 | 15 | 14 | 12 | 14 | 14 |
| V - throughput (cc) | | | | | | | | |
| 1 minute | 170 | 110 | 115 | 80 | 120 | 85 | 150 | 90 |
| 3 minutes | | 205 | 250 | 125 | | 155 | 345 | 155 |
| 5 minutes | 450 | 250 | 340 | 135 | 370 | 220 | 475 | 190 |
| 10 minutes | 605[a] | 260 | 495 | 135 | 425[b] | 250 | 680[c] | 200[d] |
| 15 minutes | | | 596 | | | | | |

Footnotes:
[a] Exhausted supply of grout
[b] Seven minutes
[c] Exhausted supply of grout at 9 minutes
[d] Flow stopped Physical Testing of Slag Dispersions Viscosity To a plastic cup add:

X g. dispersant solution (0.5 g of a 40% solution typical but vary to achieve concentration tabulated)
100 g. water (mixed with above by a spatula)
50 g. slag or other cementitious material, such as a slag-cement mixture.

The volume is sufficient to cover the blade of a high speed mixer (Osterizer Model Galaxie). The formulation is mixed for 10 seconds and poured into the cup of a Brookfield Model ¼ x RVT UL viscometer. The rotatable cylinder of the instrument is inserted, overflowing any excess formulation, care being taken that the formulation covers the cylinder appropriately. The viscosity is measured at 10, 20, 50 and 100 revolutions per minute in that order (10 and 100 RPM results are given in the following tables). The measurements are completed in about ten minutes.

The formulation slurry is poured into a plastic cup and 5 g. of 50% NaOH is added, the slurry shaken well, then poured into the Brookfield UL cup as before, and the viscosity readings repeated. In some instances the viscosity measurement is repeated one hour later.

Conversion of the Brookfield dial readings, recorded in the tables herein, to apparent viscosity in centipoise is by multiplying 10 RPM readings by 1.65 and 100 RPM readings by 0.16.

Set Time and Settlement

Upon completion of the viscosity measurements and return of the slurry to the plastic cup, the cup is tilted periodically while the surface of the slurry is observed. When there is no flow or gross motion of the surface as the cup is tilted to 45 degrees, the time is noted. This is the set time.

Particularly at high water ratios, settling of the solids in the slurry is observed; the percent of the total volume present as relatively clear surface liquid is reported as percent settlement.

Strength

Hardness development is monitored by measurement of the compressive strength and is reported, along with the time after sample preparation. The strength measurement employs a hand-held penetrometer (Soiltest CL-700 Pocket Penetrometer, Soiltest Inc., Chicago, Illinois) and follows the manufacturer's instructions. The penetrometer is held by its handle with the piston at right angles to the cementitious material (CM) surface. With steady pressure the piston is pushed into the CM to the depth of the calibration groove about ¼ inch from the end of the piston. The compressive strength is read on the scale of the instrument.

TABLE 4

Viscosity and Strength Measurements - Cementitious Materials (CM)
Composition: 100 water, 50 CM, 5 NaOH (50%), dispersant noted

| | | | Viscometer Reading | | | | | |
| | | | Neat | | NaOH | | Strength | |
| Expl. | Dispersant (Wt. % on CM) | CM | 10 RPM | 100 RPM | 10 RPM | 100 RPM | Hrs. | kg/cm² |
|---|---|---|---|---|---|---|---|---|
| 51 -A | 0.8% 208 | M1 | 2 | 15.5 | 3.5 | 16.5 | 10 | >4.5 |
| -B | 0.4% 208 | M1 | 4.5 | 15 | 5.5 | 21 | 10 | >4.5 |
| -C | 0.4% 208 | M5 | 11 | 31.5 | 8.5 | 27 | 10 | <0.1 |
| -D | 0.4% 208 | M3 | 18 | 53.5 | 13. | 56.5 | 11 | 1.0 |
| -E | 0.43% N2 | M5 | 7 | 20.5 | 7. | 23.5 | 10 | <0.1 |
| -F | 0.43% N2 | M1 | 3 | 14 | 5. | 18 | 12 | 0.5 |

TABLE 5

Physical Property Measurements
Composition: 100 water, 50 M1 slag, 5 NaOH (50%), dispersant noted

| | | Viscometer Reading | | | | | Settle- | | |
| | | Neat | | NaOH | | Set | ment | Strength | |
| Expl. | Dispersant (Wt % on slag) | 10 RPM | 100 RPM | 10 RPM | 100 RPM | Hrs. | % | Hrs. | kg/cm² |
|---|---|---|---|---|---|---|---|---|---|
| 52 -A | 0.43% N2 | 5 | 15 | 5.5 | 19 | 3 | | 7/17 | <0.1/3 |
| -B | 0.2% 208 & 0.8% Disal | 4.5 | 13.5 | 2.5 | 16.5 | 4 | | 7/17 | 0.5/4 |
| -D | 0.4% 208 | 3.5 | 14.5 | 4 | 20 | 3 | | 7/17 | 0.5/4 |
| -E | 0.43% Disal | 5 | 16 | 7.5 | 23 | 2 | | 7/17 | 1/>4.5 |
| 56 -A | 0.43% 104S | 5 | 15 | 12 | 32 | | 15 | 10/13.5 | 2.5/4.2 |
| -B | 0.43% 124S | 4.5 | 14.5 | 6.5 | 17.5 | | 40 | 10/13.5 | >4.5/>4.5 |
| -C | 0.40% 134S | 4 | 14.5 | 6 | 22.5 | | 35 | 10/13.5 | 4.5/>4.5 |
| -D | 0.40% 184S | 3.5 | 17 | 4.5 | 20 | | 45 | 10/13.5 | <0.1/3.8 |
| -E | 0.43% N2 | 1 | 8 | 5.5 | 21.5 | 2 | 30 | 13.5 | >4.5 |
| 57 -A | 0.22% 104S | 3 | 15 | 8 | 24 | 1 | 10 | 11.5 | 4.5 |
| -B | 0.22% 124S | 3 | 16.5 | 13.5 | 35 | | 15 | 12 | 4.5 |
| -C | 0.20% 134S | 3 | 15.5 | 12.5 | 32 | | 20 | 11.5 | 4.5 |
| -D | 0.20% 184S | 4 | 14 | 3.4 | 17.5 | | 50 | 11.5 | 4.5 |
| -E | 0.22% 104S & 0.20% 134S | 3 | 15 | 8 | 24 | | 30 | 13 | 4.5 |
| -F | 0.22% N2 | 2.5 | 19.5 | 7 | 21.5 | 1 | 20 | 11 | 4.5 |
| 58 -A | 0.40% 134S | 3 | 15 | 5.5 | 22 | <12 | 40 | 12 | >4.5 |
| -B | 0.43% N2 | 4 | 15 | 5 | 18 | <12 | 40 | 12 | >4.5 |
| -C | 0.32% 134S & 0.1% PVP K15 | 4 | 15 | 5 | 22 | <12 | 40 | 11 | >4.5 |
| -D | 0.32% 134S & 0.25% 731 | 3 | 15 | 5.5 | 19 | <12 | 50[a] | 11 | >4.5 |
| -E | 0.32% 134S & 0.045% 603N | 2 | 15 | 5 | 22 | <12 | 40 | 11 | >4.5 |

TABLE 5-continued

Physical Property Measurements
Composition: 100 water, 50 M1 slag, 5 NaOH (50%), dispersant noted

| Expl. | Dispersant (Wt % on slag) | Viscometer Reading Neat 10 RPM | Neat 100 RPM | NaOH 10 RPM | NaOH 100 RPM | Set Hrs. | Settlement % | Strength Hrs. | Strength kg/cm² |
|---|---|---|---|---|---|---|---|---|---|
| -F | 0.32% 134S & 0.1% 175[b] | 4 | 16 | 8 | 28 | <12 | 40 | 11 | 2.5 |
| 59 -A | 0.43% 114S | 3 | 13.5 | 9 | 22.5 |  | 35 | 12 | 4.5 |
| -B | 0.41% FP30S | 3.5 | 13.5 | 4.5 | 20.5 |  | 40 | 12 | 4.5 |
| -C | 0.365% 113M | 30 | 62 | 27 | 49 |  | 30 | 9/21 | <0.1/4.5 |
| -D | 0.385% FP31M | 4 | 15 | 35 | 49 |  | 25 | 12 | 3.5 | a. Foam
b. Percent active ingredient unknown

TABLE 6

Viscosity Measurements - Dispersant Tests
Composition: 100 water, 50 M1 slag, 5 NaOH (50%), dispersant noted

| Expl. | Dispersant (Wt. % on slag) | Neat RPM 10 | Neat 100 | NaOH 10 | NaOH 100 | NaOH + 1 Hr. 10 | NaOH + 1 Hr. 100 |
|---|---|---|---|---|---|---|---|
| 43 -A | 0.43% N2 | 7 | 17 | 7 | 22 | 6 | 21 |
| -B | 0.43% Disal | 6 | 17 | 10 | 27 | 5 rpm | >100 |
| -C | 0.43% Disal, 0.1% PVP K30 | 7 | 17 | 8 | 32 | 5 rpm | >100 |
| -D | 0.43% Disal, 0.35% Aerosol 22 | 100 | (5 rpm)[a] | 2.5 rpm | >100[a] | | |
| -E | 0.44% Daxad 16 | 6 | 36 | 16 | 36 | | |
| 44 | 0.022% N2, 0.225% Tamol 731, 0.05% PVP K15 | 7 | 19 | 11[b] | 45[b] | | |
| 45 -0 | 0.022; 0.11; 0.05[c] | 7 | 18 | 9 | 23[a,b] | | |
| -1 | 0.022; 0.06; 0.05[c] | 8 | 18 | 12 | 31[b,d] | | |
| -2 | 0.022; 0.05; 0.02[c] | 6 | 21 | 14 | 34[d] | | |
| -3 | 0.043; 0.05; 0.04[c] | 7.5 | 20.5 | 21 | 46 | | |
| -4 | 0.043; 0.08; 0.05[c] | 7 | 18 | 14 | 33 | | |
| 46 -A | None | 56 | >100 | >100 | | | |
| -B | 0.43% N2 | 5 | 16 | 5.5 | 20.5 | | |
| -C | Same as expt. 45-0 | 6 | 17.5 | 10 | 34 | | |
| 47 -A | 0.5% 2000D[n] | 5 | 18 | 65 | >100 | | |
| -B | 0.4% 2000CP[n] | 6 | 48 | 21 | 48 | | |
| 48 -A | 0.4% Alcosperse 149 | 6 | 17 | 22 | 42 | | |
| -B | 1% Alcosperse 175[n] | 6 | 10 | 7 | 22 | 6.5 | 17[e] |
| -C | 0.31% Aquatreat AR700 | 6 | 20 | 36 | 60 | | |
| -D | 0.45% Alcosperse 603 | 5.5 | 17 | 7 | 24 | | |
| -E | 0.5% Alcosperse 175[n] | 56 | 75 | >100 | | | |
| 49 -A | 0.025% Tamol 731, 0.1% Na gluconate[f] | 7.5 | 24[a] | 9 | 24 | 7[g] | 21.5[g,h] |
| -B | 0.021% Tamol 165[f] | 6 | 21.5[a] | 30 | 72 | | |
| -C | Footnote f | 6 | 22.5[i] | 34 | 61 | | |
| -D | 0.025% Tamol 731[f] | 8.5 | 28 | 15 | 44 | | |
| 50 -A | 0.50% Deflox 1050 | | 53 | 12 | 37 | | |
| -B | 0.4% 184-S | 10 | 15 | 5 | 23 | 5[j] | 21[j] |
| -C | 0.4% 208 | 6 | 17 | 7 | 21 | 4[k] | 17[k] |
| -D | 0.2% 184-S | 4 | 14 | 4.5 | 20 | | |
| -E | 0.2% 208 | 4 | 14 | 2 | 18 | | |

Footnotes:
[a]Foamy
[b]Set time - 2 hrs.; 2½% NaOH (50% aq.) employed instead of 5%
[c]In expt. 45, the numbers under "Dispersant" are percent of N2, Tamol 731 and PVP-K15, respectively
[d]Low foam
[e]Set time 24 hrs.
[f]In expt. 49, 0.1% 2000 CP, 0.045% Alcosperse 603N and 0.1% PVP-K15 are admixed with the dispersant tabulated except 49-C where no other dispersant is used
[g]Measured 1.5 hours later
[h]Set time 7 hours
[i]No foam
[j]Measured 1.2 hours later
[k]Measured 0.7 hours later
[n]Active ingredient percentage unknown, used as received

TABLE 7

Silicate Systems - Set Time and Strength

| | Example: | 53A | 53B | 53C | 53D |
|---|---|---|---|---|---|
| Composition # (all in parts by weight) | | | | | |
| a. | Water | 60 | 60 | 60 | 60 |
| | M1 | — | 16 | 16 | 10 |
| | M3 | — | 4 | — | — |
| | M5 | 20 | — | 4 | 10 |
| | 208 | 0.2 | 0.2 | 0.2 | 0.2 |
| b. | Na silicate (37.8% solids in water) | 38 | 38 | 38 | 38 |

TABLE 7-continued

| Silicate Systems - Set Time and Strength | | | | | |
|---|---|---|---|---|---|
| | Example: | 53A | 53B | 53C | 53D |
| Results: | Water | 40 | 40 | 40 | 40 |
| | Set time (minutes) | 2 | 2(soft) | 40* | 4 |
| Strength: | | | | | |
| | 1. Time (hrs.) | 23 | 4 | — | 12 |
| | kg/cm$^2$ | 1.5 | 1 | — | 0.1 |
| | 2. Time (hrs.) | 47 | 30 | — | 22 |
| | kg/cm$^2$ | >4.5 | 3 | — | 0.1 |

*Soft gel; after 76 hrs. still a soft gel for top quarter and solids settled out
In the composition, "a" and "b" are the two components of a two part system each being premixed following which they are mixed together The data of Example 51, Table 4, show that high viscosity is associated with cement being in the test formulation and that high strength is achieved when a pure slag is dispersed with a dispersant of this invention.

Table 5 and 6 give results of a number of examples. When no dispersant is employed, the apparent viscosity is very high, a reading over 100 at 10 RPM after the addition of 5% NaOH, wt. solids on slag (Example 46-A). Several of the dispersants tested under the same conditions, at 10 RPM after addition of 5% NaOH, produced improvement in viscosity of limited practical value, having an apparent viscosity over 25 on the Brookfield scale. Brookfield readings below 25 on samples tested at between 0.3 and 0.5% on M1 slag, preferably between 0.4 and 0.45%, are indicative of an acceptable dispersant. Brookfield scale readings below 10 are indicative of good and readings below 6 of excellent dispersants. Thus the viscosity procedure is a quick preliminary test for candidate dispersants and may be used in conjunction with the more definitive permeation test. When used for testing, the formulation 100 water, 50 M1 slag and 5 NaOH (50% aqueous) is employed with the dispersant added at 0.4 to 0.45% by weight on slag.

Other data resulting from the examples given in Table 5 and 6 are setting time, percent settlement and strength. These data illustrate the range of values obtainable and are useful in the practice of the invention. Example 53, Table 7, illustrates the use of a dispersant of this invention in slag-cement-silicate formulations.

Comparison of the viscosity in Tables 4, 5 and 6, for the slag dispersions made with prior art dispersant N-2, a sulfonate, and the corresponding dispersions made using the sodium polyacrylate polymers shows that the viscosities are fairly similar. In view of this similarity the differences in permeation observed upon using these dispersants, in Tables 1, 2 and 3, are startlingly great. One can speculate about an explanation without it being considered a binding portion of this disclosure. Certain high polymers are known to improve the flow of water and aqueous systems through pipes, fire hoses and the like by a mechanism involving decreased turbulence due to adsorbed polymer effectively smoothing the wall of the pipe. It is possible that the comparatively low molecular weight polymer of this invention has a similar effect in the very short constrictions represented by the "throat region" or opening between packed grains of sand and the short constricted regions in any narrow channels occurring in earthen formations.

Unconfined Compression Strength

The test is run on a 5.08 cm. long specimen having a cross-section area of 4.52 cm$^2$. Two grout samples are prepared each having 100 parts of water and 100 parts M1 slag, by weight; to one is added 0.4 parts Polyacryl 208, to the other 0.4 parts Polyacryl 184S. Measurements are made on an ELE Tritest 50 testing machine at a strain rate of 0.5 mm per minute. The Polyacryl 208 sample has a maximum stress of 1090 lbs. force at a strain of 45 mm and an unconfined compression strength of 109 kg/cm$^2$; the corresponding data for the Polyacryl 184S dispersed sample are 2215 lbs. force, 90 mm strain and 222 kg/cm$^2$ strength.

I claim:

1. In a composition comprising water, a ground blast-furnace slag having a specific surface area greater than 3000 cm$^2$ per gm, and, to disperse the slag in the water, an effective amount of an addition polymer the improvement comprising the polymer being a polymer of (1) at least 70 percent acrylic acid and (2) the remaining up to 30 percent, by weight, selected from the group consisting of other carboxylic acid monomers and non-condensing monomers; the polymer having a molecular weight from about 1000 to about 20,000 and being unneutralized or the salt of an alkali metal or ammonia.

2. In a composition comprising water, a ground blast-furnace slag having a specific surface area greater than 3000 cm$^2$ per gm, and an amount greater than zero and up to three percent by weight, based on the weight of the slag, of an addition polymer the improvement comprising the polymer being a polymer of (1) at least 70% acrylic acid and (2) the remaining up to 30 percent, by weight, selected from the group consisting of other carboxylic acid monomers and noncondensing monomers; the polymer having a molecular weight from about 1000 to about 20,000 and being unneutralized or the salt of an alkali metal or ammonia.

3. The composition of claim 2 wherein the other carboxylic acid monomers are selected from the group consisting of methacrylic acid and itaconic acid and the noncondensing monomers are selected from the group consisting of ethyl acrylate, methyl acrylate, methyl methacrylate, acrylonitrile, acrylamide and methacrylamide.

4. The composition of claim 2 wherein the polymer is a polymer of up to 10 percent, by weight, of the other carboxylic acid monomers and noncondensing momomers and the polymer is 0.05 to 1.5 percent by weight, based on the weight of the slag.

5. The composition of claim 3 wherein the polymer is a polymer of up to 10 percent, by weight, of the other carboxylic acid monomers and noncondensing monomers and the polymer is 0.05 to 1.5 percent by weight, based on the weight of the slag.

6. The composition of claim 2 wherein the polymer is a homopolymer of acrylic acid.

7. The composition of claim 6 comprising 0.05 to 1.5 percent of the polymer, said polymer having a molecular weight of from 2000 to 10,000.

8. The composition of claim 2 having 0.2 to one part of water per part of slag by weight.

9. The composition of claim 7 having 0.2 to one part of water per part of slag by weight.

10. The composition of claim 2 wherein the specific surface area of the slag is greater than 5000 cm$^2$ per gm with less than 50%, by weight, of the slag being larger than 7.8 micrometers and wherein the water to slag weight ratio is about one to about twelve.

11. The composition of claim 6 consisting essentially of
   (1) the slag having a specific surface area greater than 10,000 cm$^2$ per gm and less than 3%, by weight, being particles larger than 7.8 micrometers, (2) the homopolymer of acrylic acid,
and, based on the weight of the slag,
   (3) zero to 100%, by weight, of a portland cement having a specific surface area greater than 7000 cm$^2$ per gm and less than 20%, by weight, being particles larger than 7.8 micrometers,
   (4) zero to 10%, by weight, NaOH, Na$_2$CO$_3$ or a mixture thereof
and, based on the total weight of the slag and the cement,
   (5) 200% to 300%, by weight, water.

12. The composition of claim 6 consisting essentially of portion A
   (1) the slag having a specific surface area greater than 10,000 cm$^2$ per gm and less than three weight percent of particles larger than 7.8 micrometers,
   (2) the homopolymer of acrylic acid,
and, based on the weight of the slag,
   (3) about 20% to about 100%, by weight, of a portland cement having a specific surface area greater than 7000 cm$^2$ per gm and less than 20%, by weight, of particles larger than 7.8 micrometers,
   (4) about 1% to about 5%, by weight, of orthophosphate ion
and, based on the combined weight of the slag and the cement,
   (5) about 30% to about 360%, by weight, water; and portion B
based on the combined weight of the slag and the cement in portion A,
   (6) about a 60% to about 80%, of an alkali silicate having an Na$_2$O to SiO$_2$ ratio of about 1.30 to 1.35,
   (7) about 160% to 510%, by weight, water.

13. In a process for preparing a slag dispersion which comprises combining a ground blast-furnace slag having a specific surface area greater than 3000 cm$^2$ per gm, water and, to disperse the slag in the water, an effective amount of an addition polymer the improvement comprising the polymer being a polymer of at least 70% acrylic acid and the remaining up to 30 percent, by weight, selected from the group consisting of other carboxylic acid monomers and noncondensing monomers; the polymer having a molecular weight from about 1000 to about 20,000 and being unneutralized or the salt of an alkali metal or ammonia, and intensively agitating the combination to disperse the slag in the water.

14. The process of claim 13 wherein the other carboxylic acid monomers are selected from the group consisting of methacrylic acid and itaconic acid and the noncondensing monomers are selected from the group consisting of ethyl acrylate, methyl acrylate, methyl methacrylate, acrylonitrile, acrylamide and methacrylamide.

15. The process of claim 13 wherein the polymer is a polymer of up to 10 percent, by weight, of the other carboxylic acid monomers and noncondensing momomers and the effective amount is 0.05 to 1.5 percent, based on the weight of the slag.

16. The process of claim 13 wherein the polymer is a homopolymer of acrylic acid.

17. The process of claim 16 wherein the effective amount is 0.05 to 1.5 percent based on the weight of the slag, the polymer molecular weight being 2000 to 10,000.

18. The process of claim 17 employing 0.2 to one part of water per part of slag by weight.

19. The process of claim 13 wherein the specific surface area of the slag is greater than 5000 cm$^2$ per gm with less than 50%, by weight, of the slag being larger than 7.8 micrometers and wherein the water to slag weight ratio is about one to about twelve.

20. The process of claim 16 consisting essentially of combining the ground blast-furnace slag, the water and the addition polymer and agitating the combination to disperse the slag in the water.

21. The process of claim 16 consisting essentially of combining
   (1) the slag having a specific surface area greater than 10,000 cm$^2$ per gm and less than 3%, by weight, being particles larger than 7.8 micrometers,
   (2) the homopolymer of acrylic acid,
and, based on the weight of the slag,
   (3) zero to 100%, by weight, of a portland cement having a specific surface area greater than 7000 cm$^2$ per gm and less than 20%, by weight, being particles larger than 7.8 micrometers,
   (4) zero to 10%, by weight, NaOH, Na$_2$CO$_3$ or a mixture thereof
and, based on the total weight of the slag and the cement
   (5) 200% to 300%, by weight, water, the agitating is additionally to disperse the cement in the water.

22. The process of claim 16 consisting essentially of forming a first dispersion of
   (1) the slag having a specific surface area greater than 10,000 cm$^2$ per gm and less than three weight percent of particles larger than 7.8 micrometers,
   (2) the homopolymer of acrylic acid,
and, based on the weight of the slag,
   (3) about 20% to about 100%, by weight, of a portland cement having a specific surface area greater than 7000 cm$^2$ per gm and less than 20%, by weight, of particles larger than 7.8 micrometers,
   (4) about 1% to about 5%, by weight, of orthophosphate ion
and, based on the combined weight of the slag and the cement,
   (5) about 30% to about 360%, by weight, water and forming a second dispersion of,
based on the combined weight of the slag and the cement in said first dispersion,
   (6) about a 60% to about 80%, by weight, of an alkali silicate having an Na$_2$O to SiO$_2$ ratio of about 1.30 to 1.35,
   (7) about 160% to 510%, by weight, water,
and injecting said first and second dispersons into a formation.

* * * * *

UNITED STATES PATENT AND TRADEMARK OFFICE
CERTIFICATE OF CORRECTION

PATENT NO. : 4,897,119
DATED : Jan. 30, 1990
INVENTOR(S) : William J. Clarke

It is certified that error appears in the above-identified patent and that said Letters Patent is hereby corrected as shown below:

Column 2, line 16, cancel "waster" and insert --waste--.

Column 10, line 66, before "a perforated" insert --and--.

Column 11, line 34, cancel "dispe sant" and insert --dispersant--.

Column 11, line 35, cancel "con idered" and insert --considered--.

Column 12, Table 3, line 2 of the tabulation, before "% solids" insert a dash, -- - --.

Column 12, Table 3, line 4 of the tabulation, before "Visc. avg." insert a dash, -- - --.

Column 14, Table 5, third from last line, cancel "0.25% 731" and insert --0.025% 731--.

Column 18, line 30, cancel "1000to" and insert -- 1000 to --.

Signed and Sealed this

Twelfth Day of March, 1991

Attest:

HARRY F. MANBECK, JR.

*Attesting Officer*      *Commissioner of Patents and Trademarks*